(12) United States Patent
Havlir et al.

(10) Patent No.: US 11,250,538 B2
(45) Date of Patent: Feb. 15, 2022

(54) COMPLETION SIGNALING TECHNIQUES IN DISTRIBUTED PROCESSOR

(71) Applicant: Apple Inc., Cupertino, CA (US)

(72) Inventors: Andrew M. Havlir, Orlando, FL (US); Ajay Simha Modugala, Orlando, FL (US)

(73) Assignee: Apple Inc., Cupertino, CA (US)

(*) Notice: Subject to any disclaimer, the term of this patent is extended or adjusted under 35 U.S.C. 154(b) by 71 days.

(21) Appl. No.: 16/812,724

(22) Filed: Mar. 9, 2020

(65) Prior Publication Data

US 2021/0279832 A1 Sep. 9, 2021

(51) Int. Cl.
*G06T 1/20* (2006.01)
*G06F 9/48* (2006.01)
*G06F 9/50* (2006.01)
*G06T 15/00* (2011.01)

(52) U.S. Cl.
CPC ............. *G06T 1/20* (2013.01); *G06F 9/4818* (2013.01); *G06F 9/505* (2013.01); *G06T 15/005* (2013.01)

(58) Field of Classification Search
None
See application file for complete search history.

(56) References Cited

U.S. PATENT DOCUMENTS

| | | | |
|---|---|---|---|
| 9,009,712 B2 | 4/2015 | Schmit et al. | |
| 9,256,915 B2 | 2/2016 | Bourd et al. | |
| 9,436,504 B2 | 9/2016 | Durant | |
| 10,691,501 B1* | 6/2020 | Hussain | G06F 9/5077 |
| 2019/0205745 A1 | 7/2019 | Sridharan et al. | |
| 2019/0212984 A1* | 7/2019 | Boersma | G06F 7/506 |
| 2020/0098160 A1* | 3/2020 | Havlir | G06T 15/005 |

* cited by examiner

*Primary Examiner* — Saptarshi Mazumder
(74) *Attorney, Agent, or Firm* — Kowert, Hood, Munyon, Rankin & Goetzel, P.C.

(57) ABSTRACT

Techniques are disclosed relating to tracking compute workgroup completions in a distributed processor. In some embodiments, an apparatus includes a plurality of shader processors configured to perform operations for compute workgroups included in compute kernels, a master workload parser circuit, a plurality of distributed workload parser circuits, and a communications fabric connected to the plurality of distributed workload parser circuits and the master workload parser circuit. In some embodiments, a distributed workload parser circuit is configured to maintain, for each of a set of the shader processors, a data structure that specifies a count of workgroup completions for one or more kernels processed by the shader processor, determine, for the set of shader processors based on counts of workgroup completions for a first kernel, an aggregate count of completions to report for the first kernel, send the aggregate count to the master workload parser circuit over the communications fabric, and adjust the data structures to reflect counts included in the aggregate count.

20 Claims, 7 Drawing Sheets

COMPLETION SIGNALING TECHNIQUES IN DISTRIBUTED PROCESSOR

BACKGROUND

Technical Field

This disclosure relates generally to parallel processing and more particularly to distributing and tracking compute work for distributed processing elements (e.g., GPU shader cores).

Description of the Related Art

Given their growing compute capabilities, graphics processing units (GPUs) are now being used extensively for large-scale compute workloads. APIs such as Metal and OpenCL give software developers an interface to access the compute power of the GPU for their applications. In recent times, software developers have been moving substantial portions of their applications to using the GPU. Furthermore, GPUs are becoming more powerful in new generations.

Compute work is often specified as kernels that are multi-dimensional aggregations of compute workgroups. For example, a program executed by a central processing unit may use one or more compute kernels that are compiled for another processor such as a GPU or digital signal processor (DSP). One common kernel organization is a three-dimensional kernel that includes a number of workgroups in each of the x, y, and z dimensions. Distributing and tracking compute work efficiently may substantially affect performance and power consumption for compute tasks.

Figure 1A:
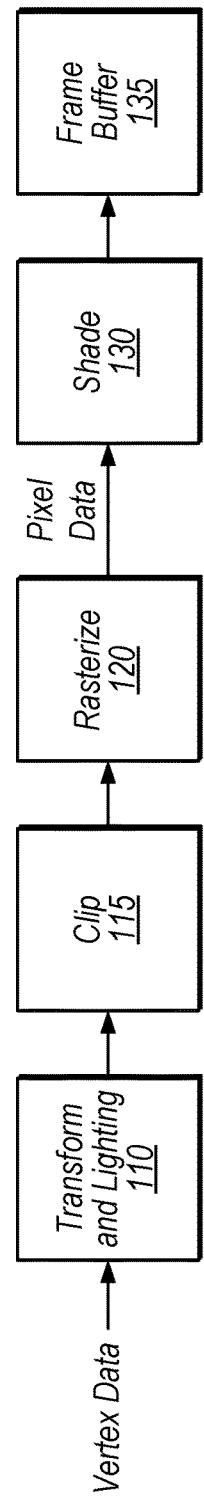
FIG. 1A is a block diagram illustrating an example graphics processing flow.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "workload parser circuit configured to distribute batches of workgroups" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Further, as used herein, the terms "first," "second," "third," etc. do not necessarily imply an ordering (e.g., temporal) between elements. For example, a referring to a "first" graphics operation and a "second" graphics operation does not imply an ordering of the graphics operation, absent additional language constraining the temporal relationship between these operations. In short, references such as "first," "second," etc. are used as labels for ease of reference in the description and the appended claims.

DETAILED DESCRIPTION

Graphics Processing Overview

Referring to FIG. 1A, a flow diagram illustrating an example processing flow 100 for processing graphics data is shown. In some embodiments, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer) and/or ignoring one or more fragments (e.g., if they are covered by other objects). Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the example elements of FIG. 1A may be performed in various orders, performed in parallel, or omitted. Additional processing steps may also be implemented.

Figure 1B:
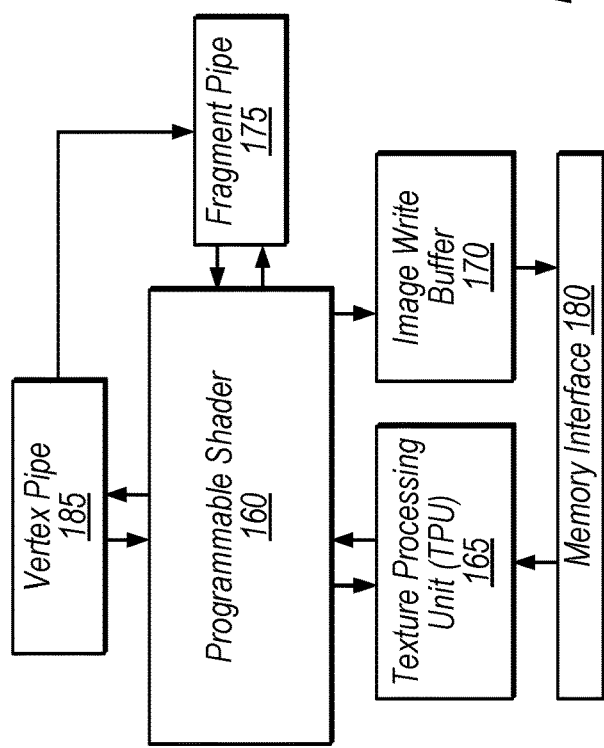
FIG. 1B is a block diagram illustrating one embodiment of a graphics unit.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write unit 170, and memory interface 180. In some embodiments, graphics unit 150 is configured to process both vertex and fragment data using programmable shader 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 and/or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 and/or programmable shader 160 to generate fragment data. Vertex pipe 185 and/or fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and/or TPU 165. Programmable shader 160 may be configured to perform vertex processing tasks on vertex data which may include various transformations and/or adjustments of vertex data. Programmable shader 160, in the illustrated embodiment, is also configured to perform fragment processing tasks on pixel data such as texturing and shading, for example. Programmable shader 160 may include multiple execution pipelines for processing data in parallel.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write unit (IWU) 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

In various embodiments, a programmable shader such as programmable shader 160 may be coupled in any of various appropriate configurations to other programmable and/or fixed-function elements in a graphics unit. The example embodiment of FIG. 1B shows one possible configuration of a graphics unit 150 for illustrative purposes.

Overview of Distribution of Workgroups from a Compute Kernel

Compute work is generally specified in kernels that are multi-dimensional structures of workitems to be performed, e.g., by a GPU. As one example, a three-dimensional kernel may have a certain number of workitems in each of the x, y, and z dimensions. Workitems may be executed similarly to graphics threads. Kernels are often compiled routines for high throughput accelerators such as GPUs or DSPs. Kernels may be specified in their own programming language (e.g., OpenCL C), managed by a graphics API such as OpenGL, or embedded directly in application code (e.g., using C++AMP). In some embodiments, workitems are aggregated into structures called workgroups. Thus, a kernel may also have a certain number of workgroups in each of the multiple dimensions. The term "workgroup" is intended to be construed according to its well-understood meaning, which includes a portion of the operations in a compute kernel. Typically, compute work is sent to a shader core at workgroup granularity. Each workgroup may include multiple workitems. A "shader core" or "shader unit" refers to a processing element configured to execute shader programs. Typically, a GPU includes a large number of shader units for parallel processing. In addition to pixel and vertex shading programs, for example, shader cores may also be used to execute compute programs. Note that, although shader cores and GPUs are discussed herein for purposes of illustration, the disclosed techniques are not limited to graphics processors, but may be applied to various parallel processor architectures.

In some embodiments, compute workload parser circuitry may iterate through a kernel in batches. For example, the parser circuitry may generate the next coordinates for the next batch in multiple dimensions and downstream circuitry may use these dimensions to access the appropriate workgroups for execution. In some embodiments, a workgroup iterator is configured to determine coordinates for a new batch every clock cycle. In some embodiments, registers may store a limit for each of the dimensions based on the size of the kernel. For example, for a kernel that has three workgroups in the x direction, four in the y direction, and five in the z direction, these registers store corresponding values, in some embodiments (e.g., 2, 3, and 4 in embodiments that start counting at zero). In some embodiments, the limit value is used to determine when to rollover when incrementing a particular coordinate for a batch.

In some embodiments, GPUs are implemented using multiple subsets of circuitry that are coupled via a communications fabric. A "communications fabric," which may also be referred to as a "switch fabric" refers to circuitry with multiple ports that is configured to route input data at one of the ports to another one of the ports. Typically, all of the inputs of a communications fabric are connected to all of the outputs of the communications fabric. Further, switch fabrics typically include a number of physical lines connecting ports (directly or indirectly), resulting in a fabric-like appearance of the circuitry.

As one example, graphics unit 150 may include global control circuitry configured to send work to multiple programmable shaders 160 via a communications fabric. Note that the shaders may be configured to operate on multiple types of work (e.g., pixel work, vertex work, and compute work) and arbitration circuitry (not shown) may allocate a portion of available shader resources to compute work. This distributed architecture may allow efficient control with an increase in overall compute power, but may introduce challenges in efficiently distributing compute work to different shaders. For example, the distributed workload parsers may have reduced information available relative to a single centralized workload parser, but it may be desirable to avoid overburdening the communications fabric when transmitting parser information. Various techniques discussed herein facilitate efficient distribution of compute work in such distributed implementations.

Figure 2:
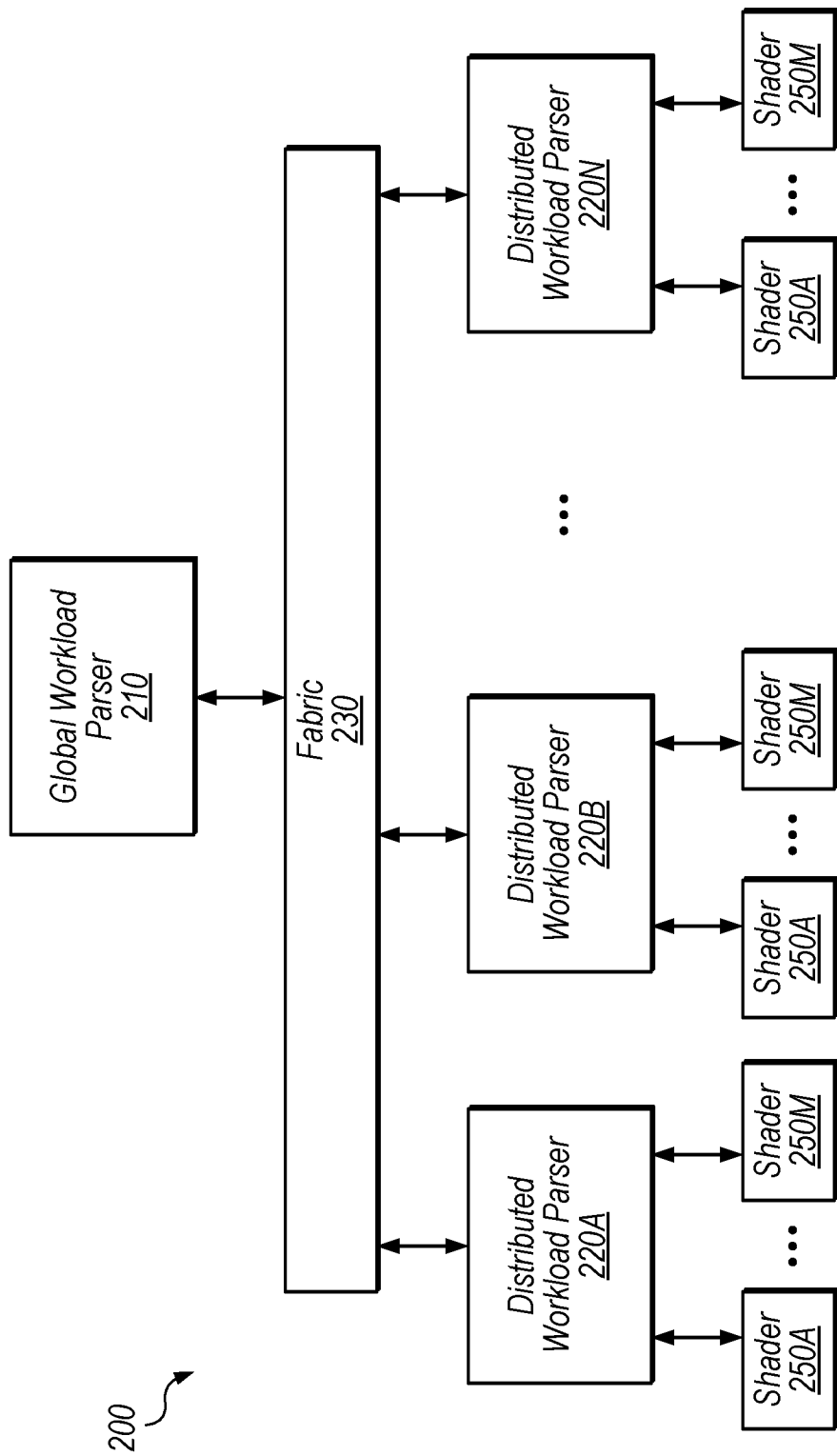
FIG. 2 is a block diagram illustrating an overview of a distributed hierarchical workload parser architecture, according to some embodiments.

FIG. 2 is a block diagram illustrating example circuitry with distributed workload parsers for different sets of shaders, according to some embodiments. In the illustrated embodiment, circuitry 200 includes global workload parser 210, distributed workload parsers 220A-N, fabric 230, and shaders 250. In some embodiments, the global workload parser is referred to as a master workload parser or master workload parser circuit. In the illustrated embodiment, the global workload parser 210 communicates with distributed workload parsers 220 via fabric 230. Each distributed workload parser 220 is configured to send compute work to the set of shaders 250 to which it is connected, in some embodiments. In some embodiments, each programmable shader 160 (or some other granularity of sub-GPU) includes a distributed workload parser 220. In some embodiments, each shader 250 is a programmable shader 160 and each distributed workload parser 220 is assigned to multiple programmable shaders. Parsers 210 and 220 may be included on the same integrated circuit along with fabric 230 or may be implemented on different integrated circuits.

Each distributed workload parser 220, in some embodiments includes a batch execution queue and a workgroup iterator. In some embodiments, parsers 220 are configured to store batches in complete form (which may be generated based on batch iterator coordinates and kernel state) in a batch execution queue such that they are insulated and independent from other parts of the processing pipeline. The workgroup iterator, in some embodiments, is configured to retrieve batches from the batch execution queue and apportion workgroups from retrieved batches among shaders 250A-M for that parser 220. Thus, in some embodiments, batches are generated globally and distributed to different distributed parsers, which in turn distribute workgroups from their received batches. U.S. patent application Ser. No. 16/143,412, filed Sep. 26, 2018 is incorporated by reference herein in its entirety. The '412 application describes such example workload parsing and distribution techniques in further detail. Various example techniques for tracking workgroup completion are discussed in further detail below.

Example Completion Aggregator Circuitry

In a distributed system, the centralized circuitry such as global workload parser 210 may track completion indicators for workgroups that have been completed. Various techniques disclosed herein allow distributed workload parsers to aggregate and report completions in an efficient way, which may reduce bandwidth use over the communications fabric. Further, disclosed techniques may provide fairness and improve performance when the fabric is stalled, e.g., by buffering completions. In some embodiments, completion circuitry is configured to aggregate multiple completions and provide an aggregated count of potentially multiple workgroup completions for a compute kernel each clock cycle. As discussed in further detail below, the completion circuitry may maintain a first-in-first-out (FIFO) buffer for each shader, select a kernel from which to report completions, and aggregate the completions for that kernel that are available at the heads of the shader FIFOs.

Figure 3:
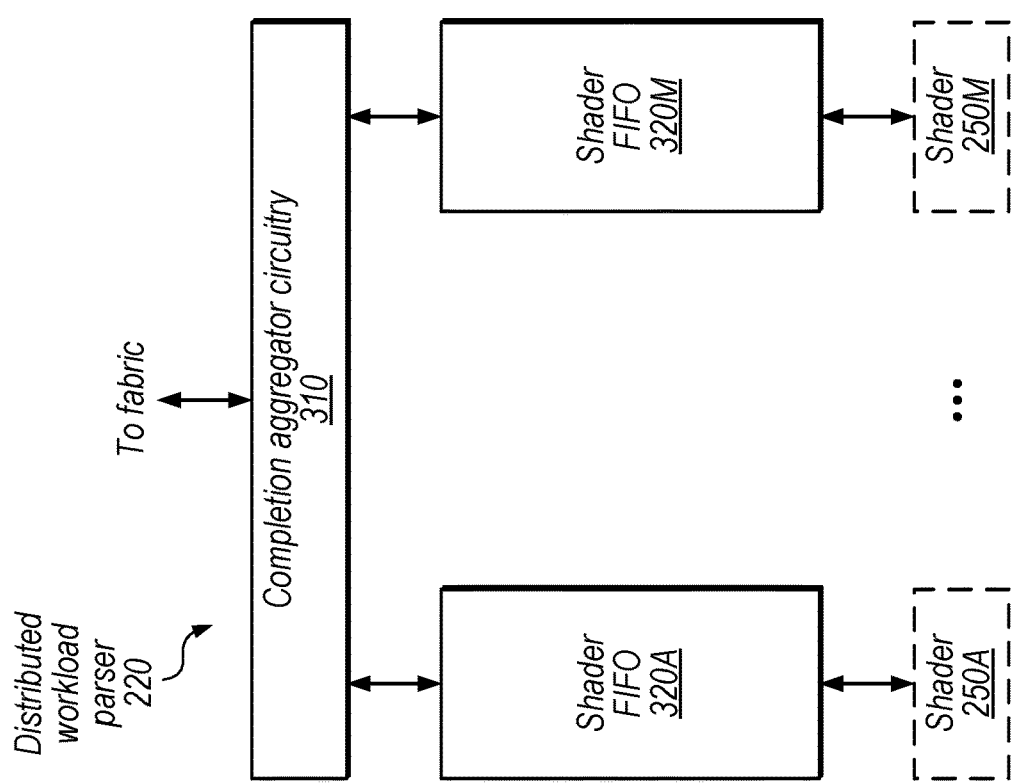
FIG. 3 is a block diagram illustrating an overview of completion aggregator circuitry in a distributed parser, according to some embodiments.

FIG. 3 is a block diagram illustrating a high-level view of example completion aggregator circuitry included in a distributed workload parser, according to some embodiments. In the illustrated embodiment, distributed workload parser 220 includes completion aggregator circuitry 310 and shader FIFOs 320A-320M.

Shaders 250, in the illustrated embodiment, report their workgroup completions to their assigned shader FIFO 320. Each completion may identify the kernel of the workgroup. The shaders may report completions individually or in messages that include completions for multiple workgroups.

Figure 4:
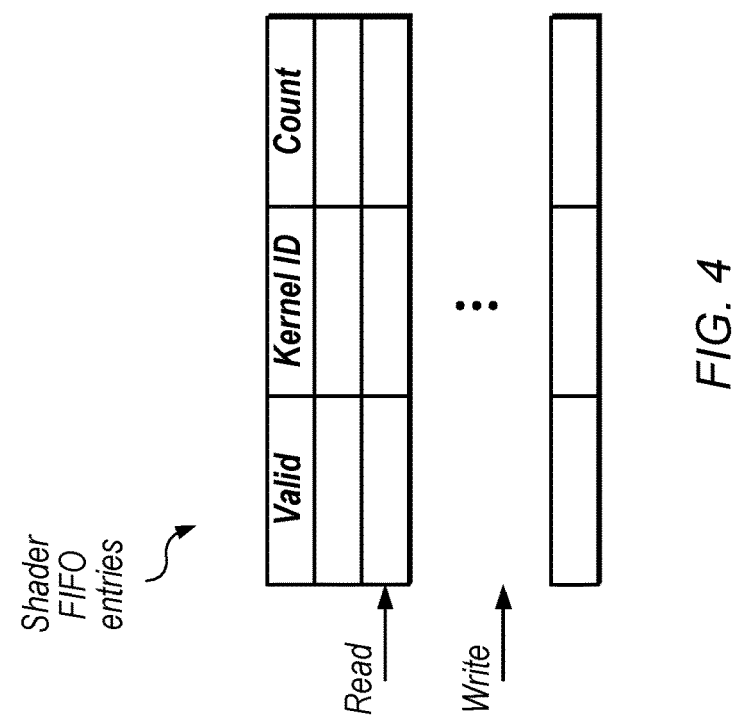
FIG. 4 is a diagram illustrating example entries in a shader FIFO that reports to completion aggregator circuitry, according to some embodiments.

Shader FIFOs 320, in the illustrated embodiment, include circuitry configured to implement a FIFO data structure. In other embodiments, the buffer circuitry for each shader 250 may implement any of various appropriate data structures for tracking completions from the shader. FIG. 4, discussed in further detail below, shows example fields for entries in a shader FIFO 320. Each entry may maintain a count of completions for a particular kernel, for example.

Figure 5:
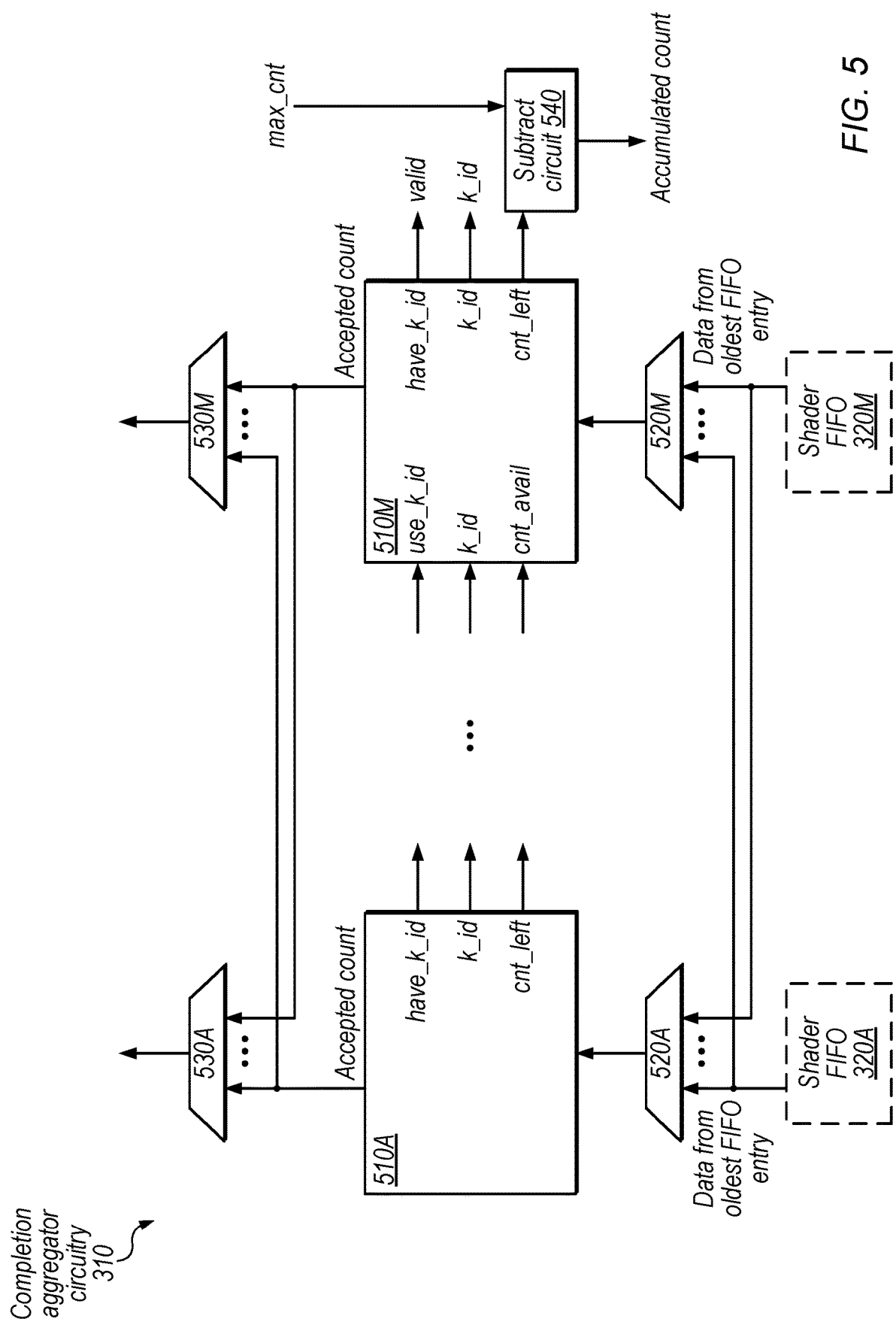
FIG. 5 is a block diagram illustrating an example chain of aggregation blocks included in completion aggregator circuitry, according to some embodiments.

Completion aggregator circuitry 310, in the illustrated embodiment, is configured to retrieve counts from the shader FIFOs 320 and report the completions to global workload parser 210 via fabric 230. In various embodiments, completion aggregator circuitry 310 may therefore report multiple completions for a kernel, including completions from multiple shaders, in a single clock cycle. FIG. 5, discussed in further detail below, shows an example implementation of completion aggregator circuitry 310.

FIG. 4 is a diagram illustrating example entries in a shader FIFO 320. In the illustrated embodiment, each entry includes a valid field, a kernel ID field, and a count field. In some embodiments, the device may discard invalid FIFO entries when they reach the front of the FIFO, but may maintain valid entries until all the value of their completion count field has been reported (note that a count from a FIFO entry may be reported over multiple cycles, in certain situations). In other embodiments, the valid field may be omitted and entry validity may be implied based on the counter value.

In the illustrated embodiment, the FIFOs use read and write pointers to track the front and tail of the FIFO, respectively. Note that different FIFOs may have oldest entries with different kernel IDs at a given point in time.

Entries with counts of zero (and for which no new completions have been received) may be invalidated and popped from the FIFO.

FIG. 5 is a block diagram illustrating a detailed view of example completion aggregator circuitry, according to some embodiments. In the illustrated embodiment, completion aggregator circuitry 310 includes a chain of aggregator blocks 510A-510N, multiplexer circuitry 520A-520N, multiplexer circuitry 530A-530N, and subtract circuit 540.

Multiplexer circuitry 520 and 530, in some embodiments, implements a priority scheme for the shader FIFOs 320 by routing data to and from the aggregator blocks 510. In some embodiments, the shader providing data to block 510A is the highest priority shader, which may dictate the kernel for which completions are reported in that cycle, assuming the highest priority shader has valid completions to report. Aggregator circuitry 310 may adjust priority by controlling the multiplexers, e.g., using a round robin fashion among shader FIFOs or using any of various selection techniques. The multiplexer circuitry may allow the chain of aggregator blocks to remain fixed while adjusting priority among shaders.

Aggregator blocks 510, in the illustrated embodiment, are configured to receive signals use_k_id, k_id, and cnt_avail (except for block 510A, which may not receive these signals) and output signals have_k_id, k_id, and cnt_left. The have_k_id signal, in some embodiments, indicates whether the current block or any preceding blocks 510 have valid FIFO entries. If this signal is not asserted and the current block 510 has a valid entry, the kernel ID of that entry may be selected as the kernel to report completions in the current cycle. If the highest priority shader has a valid entry, its kernel will be selected, however, in the illustrated embodiment. The k_id signal indicates the ID of the selected kernel. The cnt_left and cnt_avail signals indicate the number of completions that can still be added to the aggregate count, before reaching a maximum completion value. For example, consider an implementation with three bits available to report the aggregate count. In this example, the aggregator circuitry 310 can report at most eight completions in a given cycle. If the first aggregator block 510A has five completions for kernel A, and another aggregator block 510 has two completions for kernel A, then the last aggregator block 510M may report at most one completion for kernel A (which may be indicated by the cnt_avail signal). If the shader FIFO 320 assigned to the last aggregator block has more than one completion in this situation, it may report one completion and decrement the count value in its oldest FIFO entry by one.

Subtract circuit 540, in some embodiments, receives the cnt_left output of the last block 510M and subtracts this value from the max_cnt value (which indicates the greatest number of completions that completion aggregator circuitry 310 is configured to report in a cycle). The resulting accumulated count represents the number of completions to be reported for the kernel. In some embodiments, the completion aggregator circuitry reports this value, along with the kernel ID, to global workload parser 210 via fabric 230. In some embodiments, this may advantageously allow multiple completions to be reported each cycle and may reduce traffic over fabric 230 by aggregating completions. Further, the disclosed priority techniques may provide fairness among shaders competing to report completions after a fabric stall has ended, and allow aggregated completions to be sent quickly after the stall, in various embodiments.

The valid signal from block 510M may indicate whether any completions are being reported, and aggregator circuitry 310 may refrain from sending a completion message over the fabric if the valid signal is not asserted.

In the illustrated embodiment, each aggregator block 510 also outputs an accepted count which indicates the number of completions accepted from the shader to which it was assigned. Multiplexers 530 then route this information back to the corresponding shader (e.g., the shader whose FIFO data was routed to that block 510), which allows the shaders to adjust their FIFO entries appropriately, e.g., by decrementing the count in each entry by the number of completions reported for that entry.

Note that, in some embodiments, if a shader FIFO 320 has a different kernel ID in its oldest entry than the selected kernel for the cycle, it will not report any completions in that cycle. In subsequent cycles, the highest-priority shader FIFO may change or the oldest FIFO entry from the highest-priority FIFO may be for a different kernel, which may avoid deadlock and rotate among reporting for different shaders and kernels.

Example Method

Figure 6:
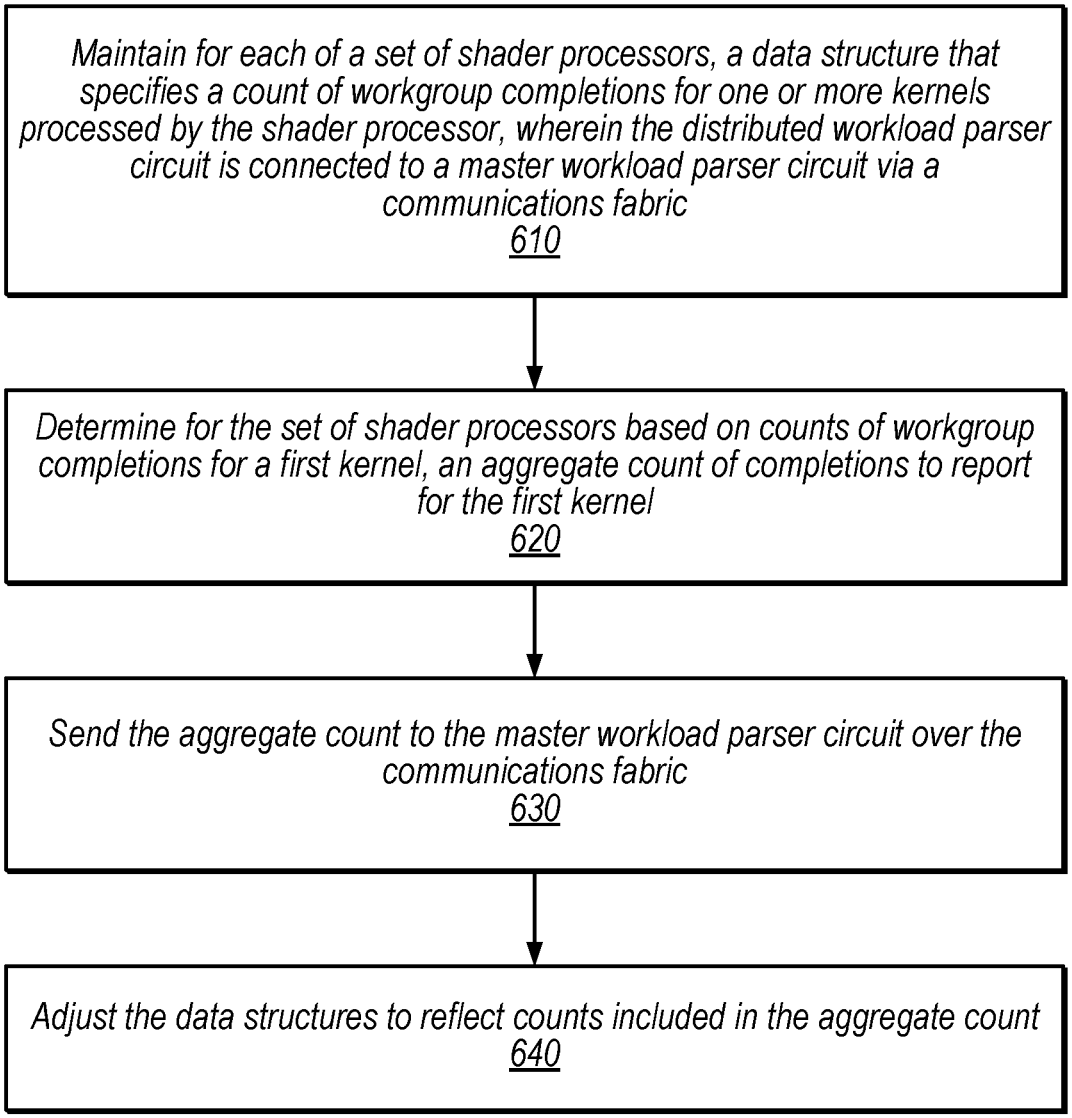
FIG. 6 is a flow diagram illustrating an example method for aggregating and reporting workgroup completion indicators, according to some embodiments.

FIG. 6 is a flow diagram illustrating a method 600 for reporting workgroup completions, according to some embodiments. The method shown in FIG. 6 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 610, in the illustrated embodiment, a distributed workload parser circuit maintains, for each of a set of shader processors, a data structure (e.g., a shader FIFO 320) that specifies a count of workgroup completions for one or more kernels processed by the shader processor. The data structure may include an entry for each kernel for which a shader processor has completions and a corresponding completion count for that kernel. Note that the device may include dedicated circuitry for the data structures. In the illustrated example, the distributed workload parser circuit is connected to a master workload parser circuit via a communications fabric.

At 620, in the illustrated embodiment, the distributed workload parser circuit determines for the set of shader processors based on counts of workgroup completions for a first kernel, an aggregate count of completions to report for the first kernel. Note that the aggregate count may not include all completions for the first kernel in the data structures. For example, if the maximum number of reportable completions is reached or if counts for the first kernel are in non-oldest FIFO entries, some completions for the first kernel may instead be reported in a later cycle.

In some embodiments, the device determines the aggregate count based on data in the oldest entry in each data structure. In some embodiments, the device maintains priority information for one or more of the data structures and the distributed workload parser circuit selects to report completions for the first kernel based on the first kernel being represented by the oldest entry in a shader FIFO having a current highest priority.

In some embodiments, the distributed workload parser circuits include respective completion aggregator circuitry configured to determine the aggregate count, which may include a chain of aggregator circuits. Aggregator circuits in the chain may receive: a completion count from a corresponding data structure, an accumulated count from one or more prior aggregator circuits in the chain, and a kernel identifier of the kernel for which counts are being aggregated. Aggregator circuits in the chain may also generate an updated accumulated count based on the received completion count and the received accumulated count and a signal indicating a number of completions accepted from the corresponding data structure. In some embodiments, the completion aggregator circuitry is configured to determine a current highest-priority shader processor and the completion aggregator circuitry includes multiplexer circuitry configured to route information from the data structure of the highest-priority shader to a starting aggregator circuit in the chain of aggregator circuits (e.g., circuit 510A) and route the signals indicating the numbers of accepted completions to corresponding shader processors. In some embodiments, the device is configured to adjust a count value for a kernel in one of the data structures based on the indicated number of completions accepted from the data structure.

In some embodiments, the distributed workload parser circuits include completion aggregator circuitry configured to determine the aggregate count in a single clock cycle using combinational logic (e.g., the logic of FIG. 5). In some embodiments, the device maintains a free counter indicating availability of shader processors to handle compute work, and the device may adjust the counter value based on the aggregate count. The device may also use the workgroup completion information to determine when a kernel has completed execution.

At 630, in the illustrated embodiment, the distributed workload parser circuit sends the aggregate count to the master workload parser circuit over the communications fabric.

At 640, in the illustrated embodiment, the distributed workload parser circuit adjusts the data structures to reflect counts included in the aggregate count. For example, the device may adjust the shader FIFO entries based on the accepted count signals from aggregator blocks 510.

Example Device

Figure 7:
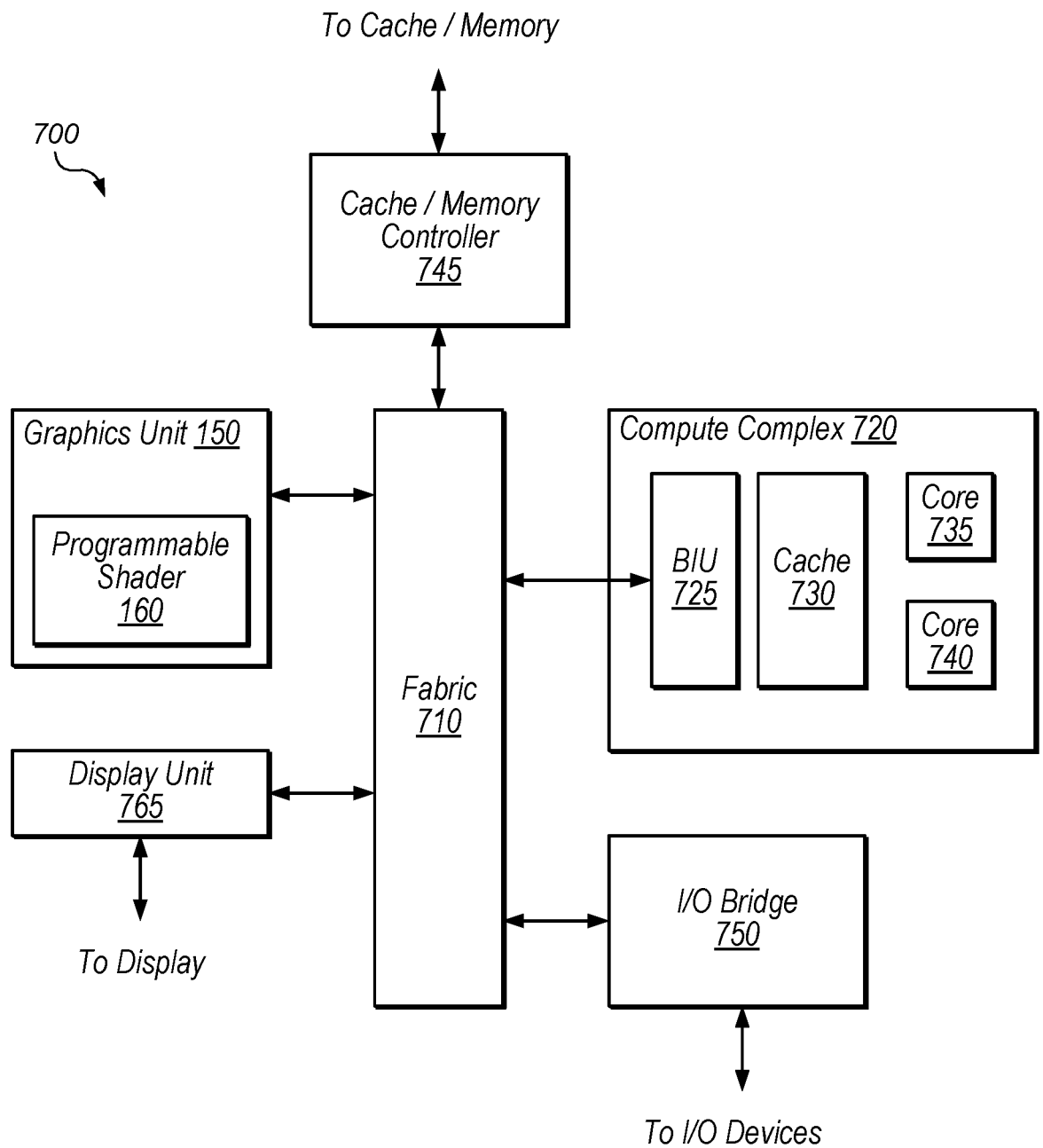
FIG. 7 is a block diagram illustrating one embodiment of a device that includes a graphics unit.

Referring now to FIG. 7, a block diagram illustrating an example embodiment of a device 700 is shown. In some embodiments, elements of device 700 may be included within a system on a chip. In some embodiments, device 700 may be included in a mobile device, which may be battery-powered. Therefore, power consumption by device 700 may be an important design consideration. In the illustrated embodiment, device 700 includes fabric 710, compute complex 720 input/output (I/O) bridge 750, cache/memory controller 745, graphics unit 150, and display unit 765. In some embodiments, device 700 may include other components (not shown) in addition to and/or in place of the illustrated components, such as video processor encoders and decoders, image processing or recognition elements, computer vision elements, etc.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, compute complex 720 includes bus interface unit (BIU) 725, cache 730, and cores 735 and 740. In various embodiments, compute complex 720 may include various numbers of processors, processor cores and/or caches. For example, compute complex 720 may include 1, 2, or 4 processor cores, or any other suitable number. In one embodiment, cache 730 is a set associative L2 cache. In some embodiments, cores 735 and/or 740 may include internal instruction and/or data caches.

In some embodiments, a coherency unit (not shown) in fabric 710, cache 730, or elsewhere in device 700 may be configured to maintain coherency between various caches of device 700. BIU 725 may be configured to manage communication between compute complex 720 and other elements of device 700. Processor cores such as cores 735 and 740 may be configured to execute instructions of a particular instruction set architecture (ISA) which may include operating system instructions and user application instructions.

Cache/memory controller 745 may be configured to manage transfer of data between fabric 710 and one or more caches and/or memories. For example, cache/memory controller 745 may be coupled to an L3 cache, which may in turn be coupled to a system memory. In other embodiments, cache/memory controller 745 may be directly coupled to a memory. In some embodiments, cache/memory controller 745 may include one or more internal caches.

As used herein, the term "coupled to" may indicate one or more connections between elements, and a coupling may include intervening elements. For example, in FIG. 7, graphics unit 150 may be described as "coupled to" a memory through fabric 710 and cache/memory controller 745. In contrast, in the illustrated embodiment of FIG. 7, graphics unit 150 is "directly coupled" to fabric 710 because there are no intervening elements.

Graphics unit 150 may include one or more processors and/or one or more graphics processing units (GPU's). Graphics unit 150 may receive graphics-oriented instructions, such as OPENGL®, Metal, or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images.

In some embodiments, graphics unit 150 is configured to perform one or more of the workgroup completion reporting techniques discussed herein.

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement: universal serial bus (USB) communications, security, audio, and/or low-power always-on functionality, for example. I/O bridge 750 may also include interfaces such as pulse-width modulation (PWM), general-purpose input/output (GPIO), serial peripheral interface (SPI), and/or inter-integrated circuit (I2C), for example. Various types of peripherals and devices may be coupled to device 700 via I/O bridge 750.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 8:
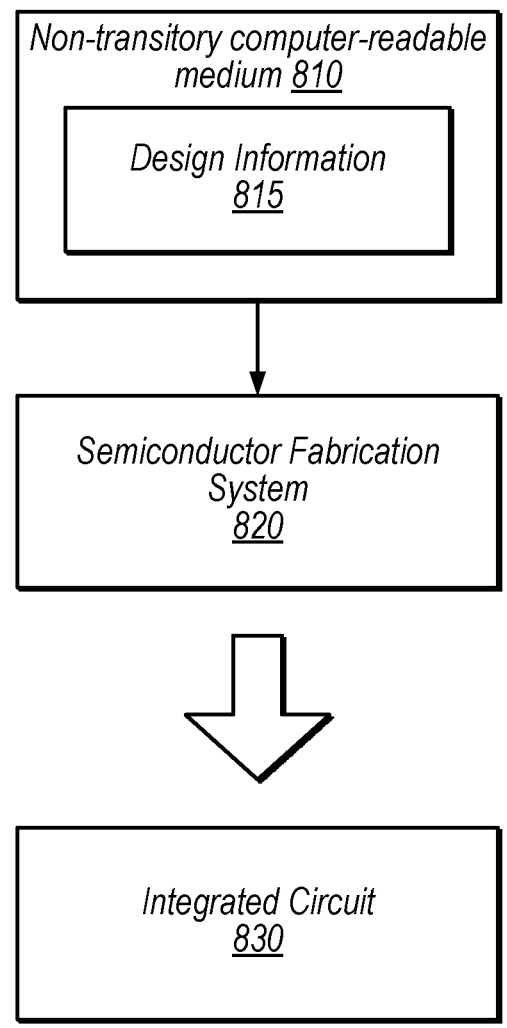
FIG. 8 is a block diagram illustrating an example computer-readable medium that stores circuit design information, according to some embodiments.

FIG. 8 is a block diagram illustrating an example non-transitory computer-readable storage medium that stores circuit design information, according to some embodiments. In the illustrated embodiment semiconductor fabrication system 820 is configured to process the design information 815 stored on non-transitory computer-readable medium 810 and fabricate integrated circuit 830 based on the design information 815.

Non-transitory computer-readable storage medium 810, may comprise any of various appropriate types of memory devices or storage devices. Non-transitory computer-readable storage medium 810 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 810 may include other types of non-transitory memory as well or combinations thereof. Non-transitory computer-readable storage medium 810 may include two or more memory mediums which may reside in different locations, e.g., in different computer systems that are connected over a network.

Design information 815 may be specified using any of various appropriate computer languages, including hardware description languages such as, without limitation: VHDL, Verilog, SystemC, SystemVerilog, RHDL, M, MyHDL, etc. Design information 815 may be usable by semiconductor fabrication system 820 to fabricate at least a portion of integrated circuit 830. The format of design information 815 may be recognized by at least one semiconductor fabrication system 820. In some embodiments, design information 815 may also include one or more cell libraries which specify the synthesis and/or layout of integrated circuit 830. In some embodiments, the design information is specified in whole or in part in the form of a netlist that specifies cell library elements and their connectivity. Design information 815, taken alone, may or may not include sufficient information for fabrication of a corresponding integrated circuit. For example, design information 815 may specify the circuit elements to be fabricated but not their physical layout. In this case, design information 815 may need to be combined with layout information to actually fabricate the specified circuitry.

Integrated circuit 830 may, in various embodiments, include one or more custom macrocells, such as memories, analog or mixed-signal circuits, and the like. In such cases, design information 815 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 820 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 820 may also be configured to perform various testing of fabricated circuits for correct operation.

In various embodiments, integrated circuit 830 is configured to operate according to a circuit design specified by design information 815, which may include performing any of the functionality described herein. For example, integrated circuit 830 may include any of various elements shown in FIG. 1B or 2, 3, or 5. Further, integrated circuit 830 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a plurality of shader processors configured to perform operations for compute workgroups included in compute kernels processed by the apparatus;
   a master workload parser circuit;
   a plurality of distributed workload parser circuits;
   a communications fabric connected to the plurality of distributed workload parser circuits and the master workload parser circuit;
   where at least one of the distributed workload parser circuits is configured to:
      maintain, for each of a set of the shader processors, a data structure that specifies a count of workgroup completions for one or more kernels processed by the shader processor;

determine, for the set of shader processors based on counts of workgroup completions for a first kernel, an aggregate count of completions to report for the first kernel;

send the aggregate count to the master workload parser circuit over the communications fabric; and adjust the data structures to reflect counts included in the aggregate count.

2. The apparatus of claim 1, wherein the data structure is a first-in first-out (FIFO) structure that includes an entry for each kernel for which a shader processor has completions and a corresponding completion count for that kernel.

3. The apparatus of claim 2, wherein the distributed workload parser circuit is configured to determine the aggregate count based on data in the oldest entry in each FIFO.

4. The apparatus of claim 3, wherein the apparatus is configured to maintain priority information for one or more of the FIFOs and wherein the distributed workload parser circuit is configured to select to report completions for the first kernel based on the first kernel being represented by the oldest entry in a shader FIFO having a current highest priority.

5. The apparatus of claim 1, wherein the distributed workload parser circuits include respective completion aggregator circuitry configured to determine the aggregate count, wherein the completion aggregator circuitry includes:
a chain of aggregator circuits including one or more aggregator circuits configured to:
receive:
a completion count from a corresponding data structure;
an accumulated count from one or more prior aggregator circuits in the chain; and
a kernel identifier of the kernel for which counts are being aggregated; and generate:
an updated accumulated count based on the received completion count and the received accumulated count; and
a signal indicating a number of completions accepted from the corresponding data structure.

6. The apparatus of claim 5, wherein the completion aggregator circuitry is configured to determine a current highest-priority shader processor; and
wherein the completion aggregator circuitry further includes multiplexer circuitry configured to route information from the data structure of the highest-priority shader to a starting aggregator circuit in the chain of aggregator circuits and route the signals indicating the numbers of accepted completions to corresponding shader processors.

7. The apparatus of claim 5, wherein the apparatus is configured to adjust a count value for a kernel in one of the data structures based on the indicated number of completions accepted from the data structure.

8. The apparatus of claim 1, wherein the distributed workload parser circuits include completion aggregator circuitry configured to determine the aggregate count in a single clock cycle using combinational logic.

9. The apparatus of claim 1, further comprising:
counter circuitry configured to adjust a counter value based on the aggregate count.

10. A method, comprising:
maintaining, by a distributed workload parser circuit, for each of a set of shader processors, a data structure that specifies a count of workgroup completions for one or more kernels processed by the shader processor, wherein the distributed workload parser circuit is connected to a master workload parser circuit via a communications fabric;

determining, by the distributed workload parser circuit, for the set of shader processors based on counts of workgroup completions for a first kernel, an aggregate count of completions to report for the first kernel;

sending, by the distributed workload parser circuit, the aggregate count to the master workload parser circuit over the communications fabric; and adjusting, by the distributed workload parser circuit, the data structures to reflect counts included in the aggregate count.

11. The method of claim 10, wherein the data structure is a first-in first-out (FIFO) structure that includes an entry for each kernel for which a shader processor has completions and a corresponding completion count for that kernel.

12. The method of claim 11, further comprising:
maintaining priority information for one or more of the FIFOs;
wherein the determining is based on data in the oldest entry in each FIFO; and
wherein the distributed workload parser circuit selects to report completions for the first kernel based on the first kernel being represented by the oldest entry in a shader FIFO having a current highest priority.

13. The method of claim 10, further comprising:
receiving, by one or more aggregator circuits in a chain of aggregator circuits:
a completion count from a corresponding data structure;
an accumulated count from one or more prior aggregator circuits in the chain; and
a kernel identifier of the kernel for which counts are being aggregated; and generating, by the one or more aggregator circuits:
an updated accumulated count based on the received completion count and the received accumulated count; and
a signal indicating a number of completions accepted from the corresponding data structure.

14. The method of claim 13, further comprising:
determining a current highest-priority shader processor; and
routing, by multiplexer circuitry, information from the data structure of the highest-priority shader to a starting aggregator circuit in the chain of aggregator circuits and routing the signals indicating the numbers of accepted completions to corresponding shader processors.

15. A non-transitory computer readable storage medium having stored thereon design information that specifies a design of at least a portion of a hardware integrated circuit in a format recognized by a semiconductor fabrication system that is configured to use the design information to produce the circuit according to the design, wherein the design information specifies that the circuit includes:
a plurality of shader processors configured to perform operations for compute workgroups included in compute kernels processed by the circuit;
a master workload parser circuit;
a plurality of distributed workload parser circuits;
a communications fabric connected to the plurality of distributed workload parser circuits and the master workload parser circuit;
where at least one of the distributed workload parser circuits is configured to:

maintain, for each of a set of the shader processors, a data structure that specifies a count of workgroup completions for one or more kernels processed by the shader processor;
determine, for the set of shader processors based on counts of workgroup completions for a first kernel, an aggregate count of completions to report for the first kernel;
send the aggregate count to the master workload parser circuit over the communications fabric; and
adjust the data structures to reflect counts included in the aggregate count.

16. The non-transitory computer readable storage medium of claim 15, wherein the data structure is a first-in first-out (FIFO) structure that includes an entry for each kernel for which a shader processor has completions and a corresponding completion count for that kernel.

17. The non-transitory computer readable storage medium of claim 16, wherein the distributed workload parser circuit is configured to determine the aggregate count based on data in the oldest entry in each FIFO; and
wherein the circuit is configured to maintain priority information for one or more of the FIFOs and wherein the distributed workload parser circuit is configured to select to report completions for the first kernel based on the first kernel being represented by the oldest entry in a shader FIFO having a current highest priority.

18. The non-transitory computer readable storage medium of claim 15, wherein the distributed workload parser circuits include respective completion aggregator circuitry configured to determine the aggregate count, wherein the completion aggregator circuitry includes:
a chain of aggregator circuits including one or more aggregator circuits configured to:
receive:
a completion count from a corresponding data structure;
an accumulated count from one or more prior aggregator circuits in the chain; and
a kernel identifier of the kernel for which counts are being aggregated; and generate:
an updated accumulated count based on the received completion count and the received accumulated count; and
a signal indicating a number of completions accepted from the corresponding data structure.

19. The non-transitory computer readable storage medium of claim 18, wherein the completion aggregator circuitry is configured to determine a current highest-priority shader processor; and
wherein the completion aggregator circuitry further includes multiplexer circuitry configured to route information from the data structure of the highest-priority shader to a starting aggregator circuit in the chain of aggregator circuits and route the signals indicating the numbers of accepted completions to corresponding shader processors.

20. The non-transitory computer readable storage medium of claim 18, wherein the circuit is configured to adjust a count value for a kernel in one of the data structures based on the indicated number of completions accepted from the data structure.

* * * * *